United States Patent
Koon

(10) Patent No.: US 6,488,307 B2
(45) Date of Patent: Dec. 3, 2002

(54) ROLL AWAY TRAILER TONGUE

(75) Inventor: George S. Koon, Manchester, TN (US)

(73) Assignee: ASC, Inc., Manchester, TN (US)

( * ) Notice: Subject to any disclaimer, the term of this patent is extended or adjusted under 35 U.S.C. 154(b) by 14 days.

(21) Appl. No.: 09/738,758

(22) Filed: Dec. 15, 2000

(65) Prior Publication Data

US 2002/0074772 A1 Jun. 20, 2002

(51) Int. Cl.7 ............................................ B60P 3/10
(52) U.S. Cl. ................ 280/491.1; 280/491.3; 280/482; 280/414.1
(58) Field of Search .................. 280/414.1, 401, 280/482, 478.1, 491.1, 491.2, 491.3

(56) References Cited

U.S. PATENT DOCUMENTS

| | | | |
|---|---|---|---|
| 3,734,540 A | * | 5/1973 | Thiermann .................. 280/482 |
| 3,945,521 A | | 3/1976 | Decker |
| 3,989,266 A | | 11/1976 | Foster |
| 4,329,108 A | | 5/1982 | Godbersen |
| 4,331,346 A | | 5/1982 | Walters |
| 4,398,742 A | | 8/1983 | Sanders |
| 4,623,161 A | | 11/1986 | Sprague |
| 4,726,601 A | | 2/1988 | Stevens |
| 5,011,176 A | | 4/1991 | Eppinette |
| 5,016,897 A | * | 5/1991 | Kauffman .................... 280/402 |
| 5,183,282 A | * | 2/1993 | Smyly, Sr. ................ 280/414.1 |
| 5,195,767 A | | 3/1993 | Roches |
| 5,624,129 A | | 4/1997 | Clark, Jr. |
| 5,810,546 A | * | 9/1998 | Schmoling .................. 414/538 |
| 5,895,066 A | | 4/1999 | Headlee |

* cited by examiner

*Primary Examiner*—Avraham Lerner
(74) *Attorney, Agent, or Firm*—Kent R. Moore

(57) ABSTRACT

A trailer tongue that can be rolled to an extended and retracted position. The present trailer tongue comprises a housing having and interior portion and an exterior portion. At least one track is located along the interior portion of the housing. In a particularly preferred embodiment, two tracks are welded to on the interior portion of the housing. The trailer tongue further includes a rollaway mechanism that preferably includes at least one wheel for rolling along the track. In a particularly preferred embodiment, the rollaway mechanism includes two wheels for rolling along the tracks welded to the interior portion of the housing. The wheels are positioned to cooperate with the tracks so that the slide mechanism rolls easily along the tracks from an extended position to a retracted position.

13 Claims, 5 Drawing Sheets

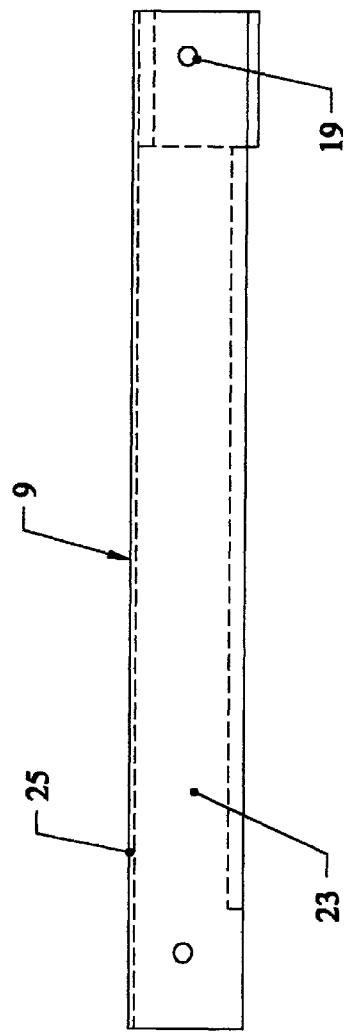
FIG. 3
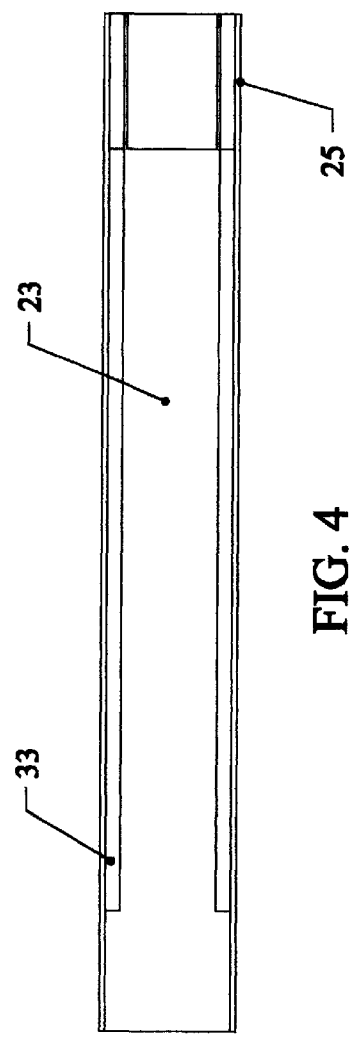
FIG. 4
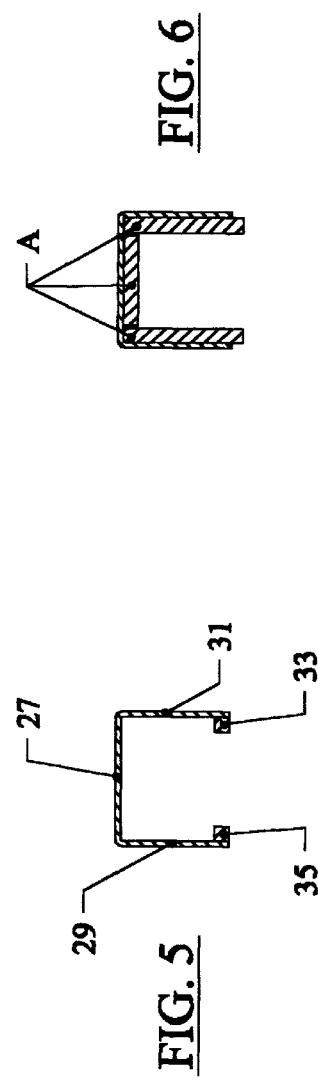
FIG. 6
FIG. 5

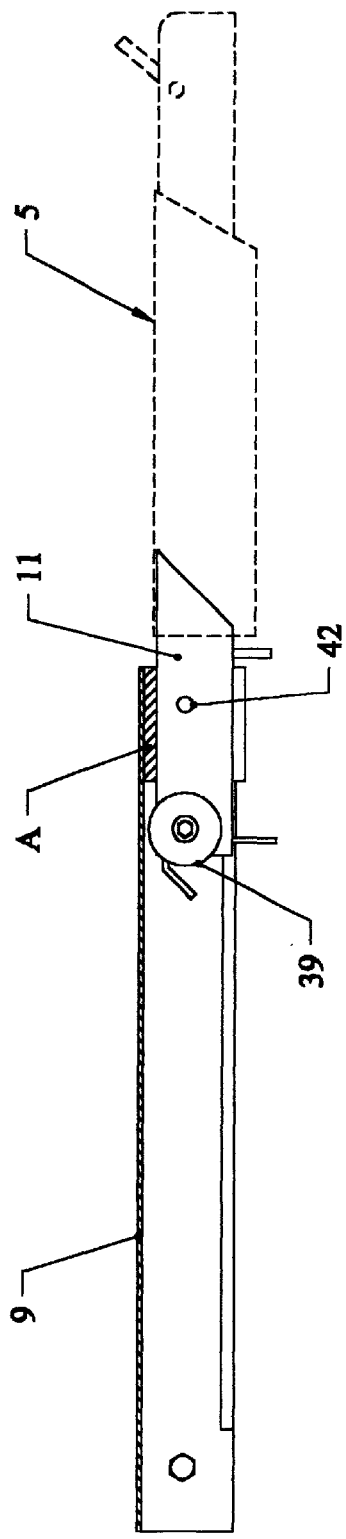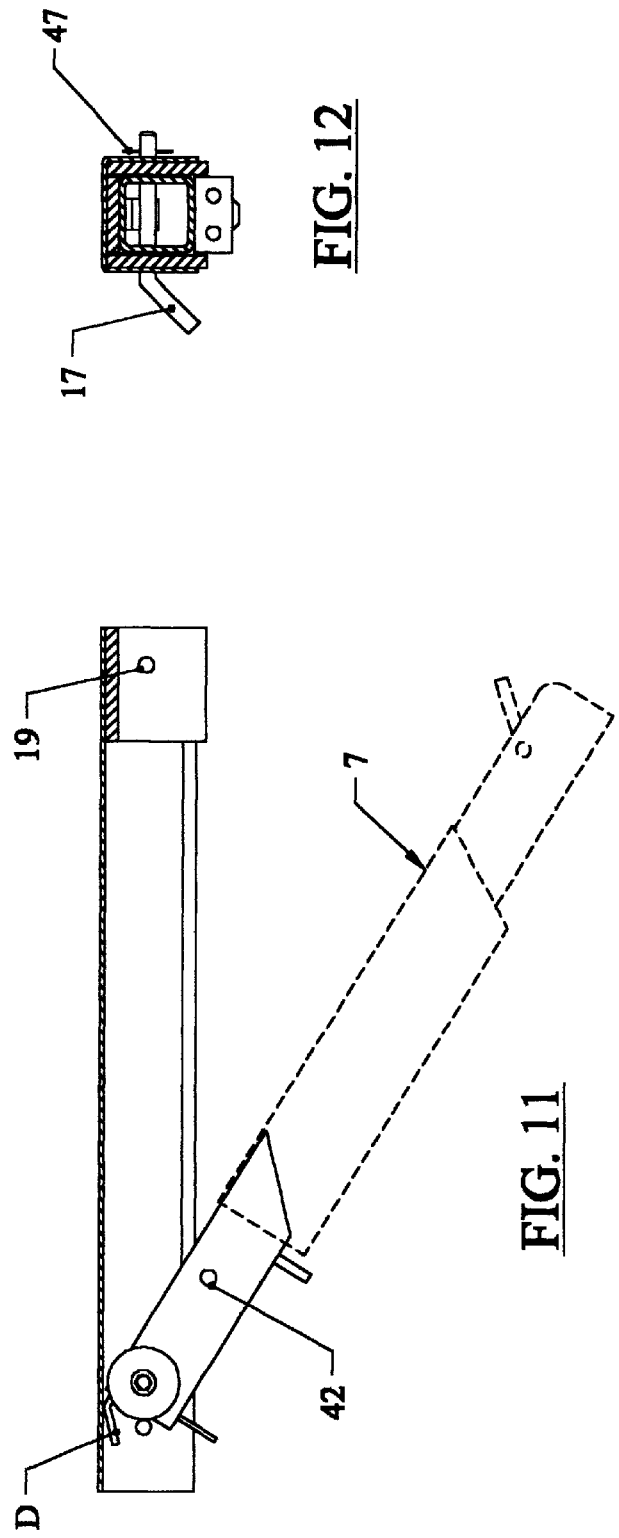

ROLL AWAY TRAILER TONGUE

FIELD

The present invention relates generally to trailer tongues and more particularly to trailer tongues attached to a trailer that may be moved either to a shortened position on a trailer to accommodate storage of a trailer in a garage or enclosed shelter, or to an extended operative position for towing behind a vehicle.

BACKGROUND

Trailers are used to tow a variety of items such as watercraft, vehicles, and equipment. Generally, trailers are connected to the rear of a vehicle by a ball and socket connection. A trailer ball is attached to the rear bumper area of a vehicle. The socket is connected to the trailer and is placed over the ball to secure the trailer to the vehicle. The ball and socket connection is preferred because it allows the trailer to pivot behind the vehicle during a turn. To allow the vehicle to be turned without binding against the trailer, as is known to those skilled in the art, a trailer tongue is positioned at the front of the trailer to provide the space necessary between the trailer and the towing vehicle.

Due to the increasing length of many of the trailers, it has become necessary to devise ways to shorten the trailer length. This is commonly accomplished through a variety of adjustable trailer tongues. Examples of such trailer tongues can be found in U.S. Pat. No. 5,624,129, issued to Clark, Jr. and U.S Pat. No. 4,331,346, issued to Walters. However, the inventions taught by those patents have many disadvantages. Clark, Jr. includes numerous component parts and requires a cover to shield the components from the weather. The trailer tongue in Clark, Jr. also does not extend and retract easily due to the pin and slot arrangement. Walters discloses a trailer tongue having an I-beam that requires a pulley system to extend and retract the tongue.

Therefore, there is a need for a trailer tongue that does not include numerous parts and that can be extended and retracted with minimal effort.

SUMMARY

The present invention is a rollaway trailer tongue that can be incorporated into most any trailer. The trailer tongue can be rolled with minimal effort to an extended and retracted position by virtue of at least one wheel that rolls along a track. The present trailer tongue comprises a housing having an interior portion and an exterior portion. The housing is preferably made of steel plate or other material used to fabricate a trailer tongue. The housing can be welded or attached to the front end of most any trailer. The steel plate is formed so that it has a C-shaped cross-section having a top portion and first and second legs depending from the top portion. There is at least one track located along the interior portion of the C-shaped housing. Preferably the track is welded to one of the legs. In a most preferred embodiment, a track is welded to each of the first and the second legs on the interior portion of the housing.

The trailer tongue further includes a rollaway mechanism positioned within the interior portion of the housing. The rollaway mechanism preferably is made from square steel tube and has at least one wheel rotatably connected to the steel tubing for rolling along the track. The rollaway mechanism is sized so it can be positioned within the interior portion of the housing. In a most preferred embodiment, the rollaway mechanism includes two wheels rotatably connected on opposite sides of the steel tubing for rolling along the tracks welded to the interior portion of the housing. The wheels are positioned to cooperate with the tracks so that the rollaway mechanism rolls along the tracks from an extended position to a retracted position. As is common in most trailer tongues, a coupler may be positioned between the trailer and the socket connection so that a brake actuator can be included in the tongue to provide braking assistance as described further below.

The described invention and its related embodiments will be better understood in view of the accompanying drawings and following detailed description.

BRIEF DESCRIPTION OF THE DRAWINGS

FIG. 3 is side view of a preferred housing of the present invention;

FIG. 4 is bottom view of the housing shown in FIG. 3;

FIG. 5 is an end view of the housing shown in FIG. 3;

FIG. 6 is an end view of the housing shown in FIG. 3;

FIG. 10 is a side view of a preferred embodiment of a trailer tongue of the present invention showing a rollaway mechanism in an extended position, and positioned within a cut-away view of a preferred housing;

FIG. 11 is a side view of the rollaway mechanism shown in FIG. 10 illustrated in a retracted position; and FIG. 12 is an end view of the rollaway mechanism shown in FIG. 10.

DETAILED DESCRIPTION

Figure 1:
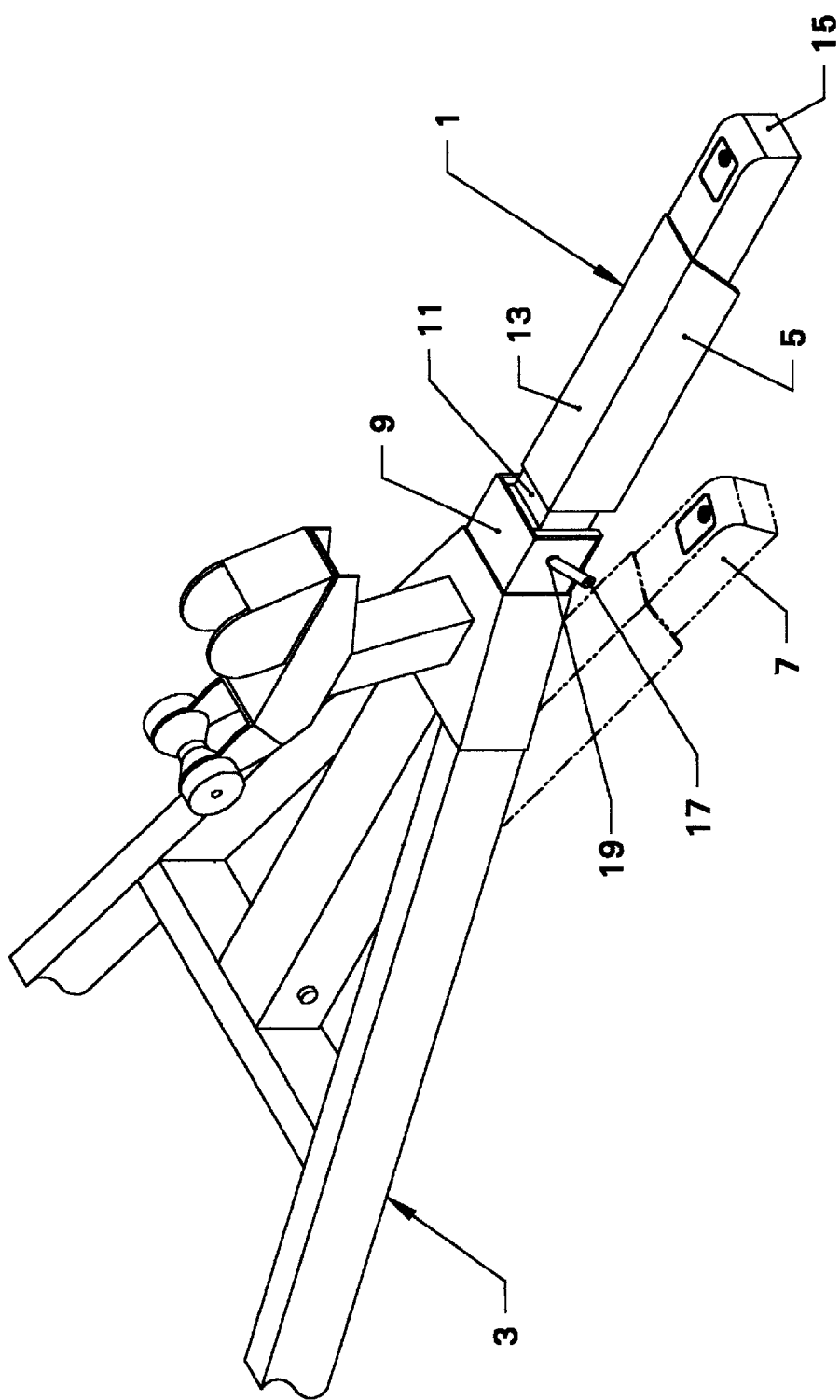
FIG. 1 is a perspective view showing a preferred embodiment of the present trailer tongue attached to a trailer and shown in both an extended position and a retracted position (in phantom lines)

Referring now to the drawings, the present rollaway trailer tongue is designated generally as 1. FIG. 1 is a perspective view showing a preferred embodiment of the present trailer tongue 1 attached to a typical trailer 3, the trailer tongue 1 being shown in both in an extended position 5 and in a retracted position 7 (in phantom lines). The present trailer tongue 1 comprises a housing 9 and a rollaway mechanism 11. In the embodiment shown, a coupler 13 is positioned between the socket 15 and the rollaway mechanism 11. As illustrated, when the tongue 1 is in its extended position 5, it may be secured in place by inserting pin 17 through hole 19 in the housing 9 and other holes (not shown yet) in the rollaway mechanism 11.

Figure 2:
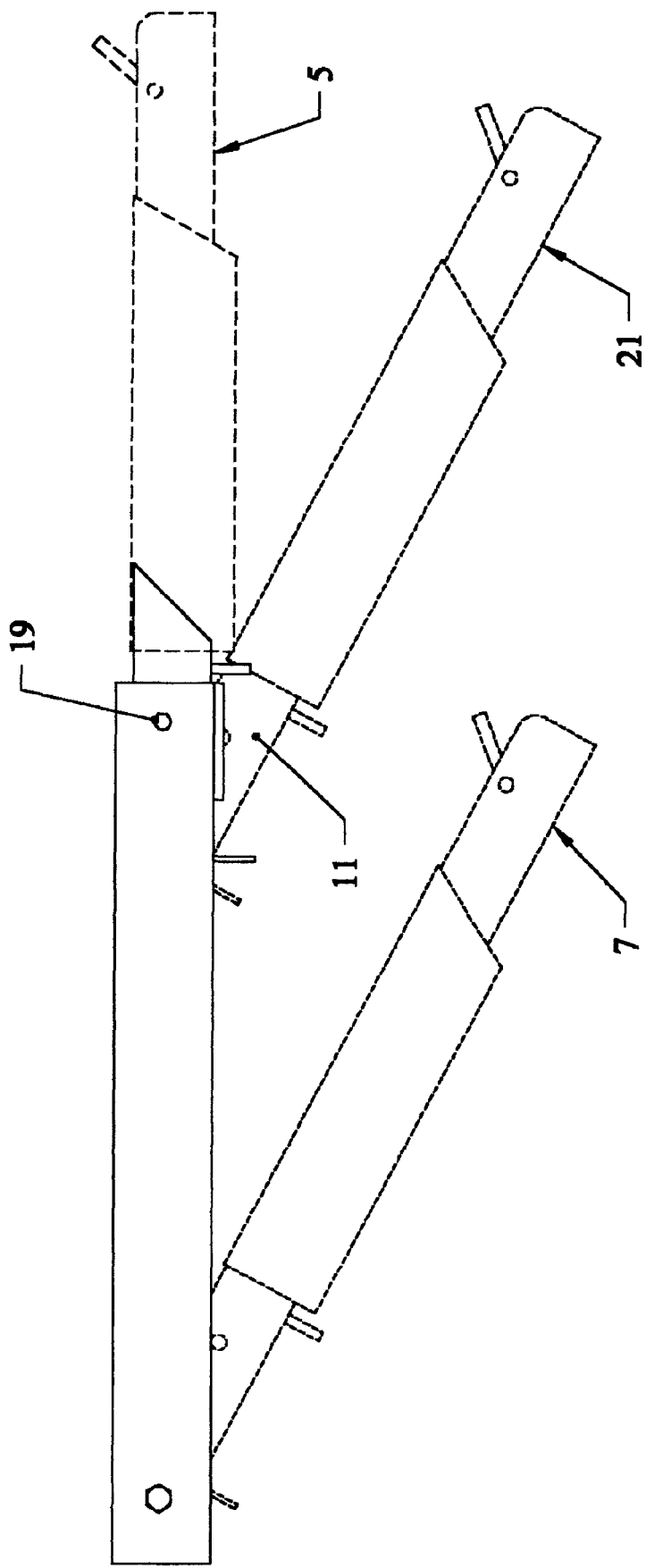
FIG. 2 is a side view of a preferred embodiment of the present trailer tongue in both an extended and retracted position.

FIG. 2 illustrates a side view of the extended 5 and retracted 7 positions of the present trailer tongue 1. When pin 17 is removed from hole 19, the rollaway mechanism 11 may be rotated from its extended position 5 to a downward position 21. The rollaway mechanism 11 may then be moved rearward to position the tongue 1 in its retracted position 7 to effectively shorten the overall length of the trailer.

Referring to FIGS. 3–6, a preferred housing 9 of the present invention is illustrated in more detail. The housing 9 is preferably made of steel plate or other material used to fabricate a trailer tongue. The housing 9 may be made to the appropriate length and strength to accommodate the size and hauling requirements of the trailer 3. The steel plate is bent so that the housing is an elongated member having a C-shaped cross-section with a top portion 27 and with first and second legs 29,31 depending from the top portion 27.

The shape of the housing 9 creates an interior portion 23 and an exterior portion 25. Preferably, the housing 9 has very few holes or other openings. So that the housing 9 can shield the components located within the interior portion 25 from the corrosive effects of rain and excessive moisture. At least one track 33, made of steel bar, is located along the interior portion 23 of the C-shaped housing 9. Preferably, the track 33 is welded to one of the legs 29, 31. In a particularly preferred embodiment, each of a first track 33 and a second track 35 are welded to the first and second depending legs 29, 31 on the interior portion 23 of the housing 9. As shown in the drawings the tracks 33, 35 may not extend the full length of the housing 9. At one end of the housing 9, there may be a series of plates A attached to the interior portion 23 of the housing 9 to act as a stop for the rollaway mechanism 11. The plates A are preferably steel and are welded to the steel housing 9, Hole 19 is located in the housing 9 to cooperate with holes (not shown yet) in the rollaway mechanism 11 for moving the trailer tongue 1 into its extended 5 and retracted 7 positions.

Figure 9:
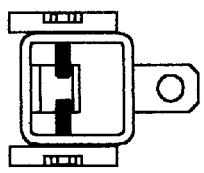
FIG. 9 is an end view of the rollaway mechanism shown in FIG. 8.
Figure 7:
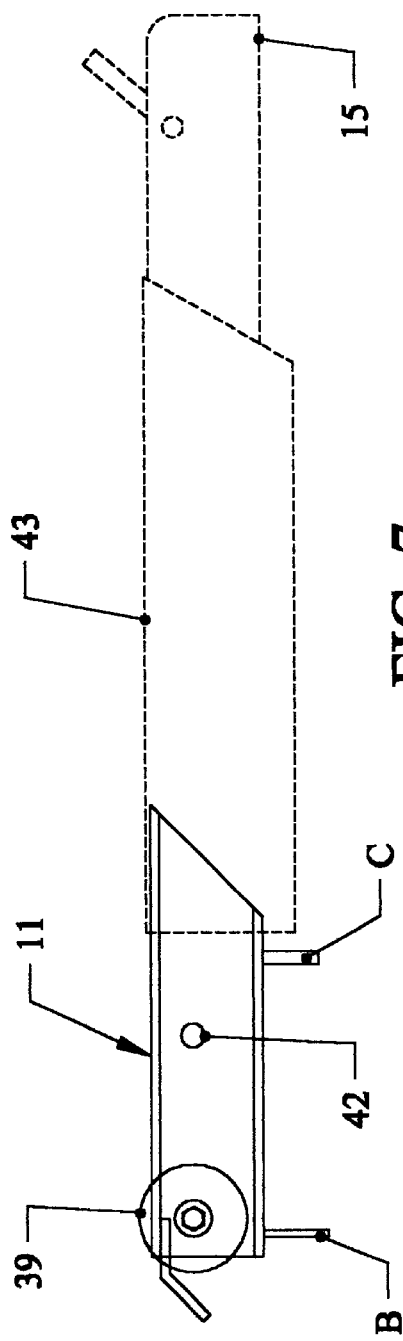
FIG. 7 is a side view of a preferred rollaway mechanism of the present invention.
Figure 8:
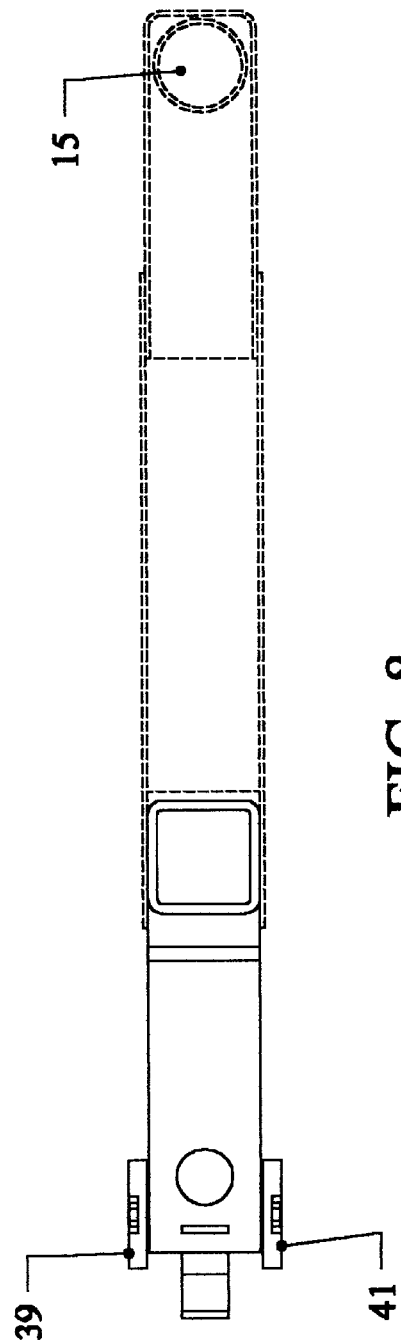
FIG. 8 is an top view of the rollaway mechanism shown in FIG. 7.

Referring now to FIGS. 7–9, the trailer tongue further includes a rollaway mechanism 11 for rolling along the tracks 33, 35 located within the interior portion 23 of the housing 9. The rollaway mechanism 11 preferably is an elongated member being made from square steel tube and has at least one wheel 39 rotatably connected to the steel tubing for rolling along the track 33. The rollaway mechanism 11 is sized so it can be positioned within the interior portion 23 of the housing 9. In a particularly preferred embodiment, the rollaway mechanism 11 includes first and second wheel 39, 41 rotatably connected on opposite sides of the steel tubing for rolling along the tracks first and second 33, 35. The wheels 39, 41 may be attached to the steel tubing in any manner suitable, as is known to those skilled in the art, to allow the first and second wheels 39, 41 to freely rotate. This is an important feature of the present invention since it allows the rollaway mechanism 11 to roll easily within the housing 9 and with minimal operator effort in sharp contrast to existing trailer tongues. The wheels 39, 41 are positioned on the rollaway mechanism 11 to cooperate with the tracks 33, 35 so that the rollaway mechanism 11 can slide along the tracks 33, 35 from an extended position 5 to a retracted position 7. The wheels 39, 41 are preferably made from steel plate or similar material to accommodate the weight and other requirements of the trailer 3. Hole 42 may be provided in the rollaway mechanism 11 to cooperate with hole 19 in the housing 9.

As is common in most trailer tongues, a coupler 43 may be included in the tongue so that a brake actuator (not illustrated) may be incorporated to provide braking assistance. As shown in FIG. 7, the coupler 43 is positioned between the rollaway mechanism 11 and the socket end 15 of the tongue 1. The brake actuator can be installed within the coupler 43. As is known to those skilled in the art, the actuator can sense the acceleration or deceleration of the vehicle and accordingly release or apply pressure to the brakes on the trailer. Various slotted tabs B, C may be welded to the rollaway mechanism 11 to accommodate the wiring, brake lines, safety chains and other accessories that are peculiar to trailers.

As illustrated in FIGS. 10–12, the rollaway mechanism 11 is shown in cooperation with the housing 9. In FIG. 10, the rollaway mechanism 11 is shown in its fully extended position 5. The wheels 39, 41 are resting against the plates A which prevent the rollaway mechanism 11 from being removed from the forward end of the housing 9. The plates A also cooperate with the components such as the coupler 13 that extend from the housing 9 to prevent the rollaway mechanism 11 from sliding rearward while in the extended position 5. Hole 42 in the rollaway mechanism 11, illustrated in FIG. 10, aligns with hole 19 of the housing 9 so that pin 17 can be inserted to lock the rollaway mechanism 11 in its extended position 5. Preferably, as shown in FIG. 12, the pin 17 can be inserted completely through both the housing 9 and rollaway mechanism 11 through a series of cooperating and aligning holes. The pin 17 can further be fixed in place by a cotter pin 47 or similar device.

If the pin 17 is removed from the housing 9 and rollaway mechanism 11, the rollaway mechanism 11 may be rotated downward and pushed easily rearward to its retracted position 7 as the wheels 39, 41 roll rearward along tracks 33, 35. The pin 17 or a lock may be inserted in hole 42 to prevent the rollaway mechanism from being rotated upward. A tab D may be welded to the rollaway mechanism 11 to prevent excess rotation of the rollaway mechanism 11.

It should be noted that numerous modifications may be made to the previously described rollaway trailer tongue without departing from the spirit and scope of the present invention. For example, any material that is sufficiently sturdy to use for trailers may be used in lieu of steel to fabricate the trailer tongue. Therefore, although the detailed description includes certain features of the present roll away trailer tongue, it is not intended that such features should be construed as limitations of the scope of the described invention. Rather, the scope of the present rollaway trailer tongue should be limited only by the following claims.

What is claimed is:

1. A trailer tongue for a trailer comprising:
   a. a housing for attaching to the front of the trailer, said housing having an interior portion and an exterior portion;
   b. a first track located in the interior portion of the housing;
   c. a rollaway mechanism located within the housing having a first wheel rotatably connected to the rollaway mechanism;
   d. said first wheel engaging said first track wherein the first wheel of the rollaway mechanism rolls along the first track so that the rollaway mechanism can be moved from an extended position to a retracted position along the trailer tongue.

2. The trailer tongue of claim 1 wherein the rollaway mechanism comprises a second wheel rotatably connected to the rollaway mechanism.

3. The trailer tongue of claim 1 wherein the rollaway mechanism comprises an elongated member having a substantially square cross-section.

4. The trailer tongue of claim 2 wherein the interior portion of the housing comprises a first leg and wherein the first track is attached to the first leg.

5. The trailer tongue of claim 2 wherein the interior portion of the housing comprises a second leg.

6. The trailer tongue of claim 5 further comprising a second track attached to the second leg.

7. The trailer tongue of claim 6 wherein both the first and second wheels roll along the first and second tracks respectively, so that the rollaway mechanism can move from an extended position to a retracted position along the trailer tongue.

8. The trailer tongue of claim 7 wherein the housing defines a first opening.

9. The trailer tongue of claim 8 where the rollaway mechanism defines a second opening.

10. The trailer tongue of claim 9 wherein the first and second openings align with each other when the rollaway mechanism is in an extended position along the trailer tongue.

11. The trailer tongue of claim 10 further comprising a pin inserted into the aligned first and second openings for locking the rollaway mechanism in an extended position along the trailer tongue.

12. A trailer tongue for a trailer comprising:
  a. a housing attached to the front of the trailer, said housing having an interior portion and an exterior portion;
  b. a first track and a second track located in the interior portion of the housing;
  c. a rollaway mechanism located within the housing, said rollaway mechanism having a first wheel and a second wheel rotatably connected to the rollaway mechanism;
  d. said first wheel engaging said first track wherein the first wheel of the rollaway mechanism rolls along the first track, said second wheel engaging said second track wherein the second wheel of the rollaway mechanism rolls along the second track so that the rollaway mechanism can be moved from an extended position to a retracted position along the trailer tongue.

13. The trailer tongue of claim 12 wherein the housing defines an opening for allowing the rollaway mechanism to rotate downward when the rollaway mechanism is in its retracted position.

* * * * *